United States Patent
Taketa et al.

(10) Patent No.: US 12,011,853 B2
(45) Date of Patent: Jun. 18, 2024

(54) METHOD FOR PRODUCING TOWPREG

(71) Applicant: Toray Industries, Inc., Tokyo (JP)

(72) Inventors: Ichiro Taketa, Ehime (JP); Reo Takaiwa, Pau (FR)

(73) Assignee: Toray Industries, Inc., Tokyo (JP)

( * ) Notice: Subject to any disclaimer, the term of this patent is extended or adjusted under 35 U.S.C. 154(b) by 351 days.

(21) Appl. No.: 17/425,083

(22) PCT Filed: Dec. 19, 2019

(86) PCT No.: PCT/IB2019/001383
§ 371 (c)(1),
(2) Date: Jul. 22, 2021

(87) PCT Pub. No.: WO2020/161516
PCT Pub. Date: Aug. 13, 2020

(65) Prior Publication Data
US 2022/0105661 A1    Apr. 7, 2022

(30) Foreign Application Priority Data
Feb. 8, 2019    (EP) .................................... 19305158

(51) Int. Cl.
*B29B 15/12* (2006.01)
*C08J 5/24* (2006.01)
(Continued)

(52) U.S. Cl.
CPC ............. *B29B 15/122* (2013.01); *C08J 5/243* (2021.05); *D04H 1/58* (2013.01); *D04H 3/04* (2013.01); *D04H 3/12* (2013.01)

(58) Field of Classification Search
None
See application file for complete search history.

(56) References Cited

U.S. PATENT DOCUMENTS 5,094,883 A    3/1992    Muzzy et al.

FOREIGN PATENT DOCUMENTS

EP    2841369 A1    3/2015
EP    3162842 A1    5/2017
(Continued)

OTHER PUBLICATIONS

Machine Translationo F JP2012184279 (Year: 2012).*
(Continued)

*Primary Examiner* — Shawn McKinnon
(74) *Attorney, Agent, or Firm* — Buchanan Ingersoll & Rooney PC

(57) ABSTRACT

The present invention relates to a method for producing a towpreg by impregnating a plurality of fiber bundles with a resin to form a single towpreg, characterized in that the method comprises providing a stock of fiber bundles for preparing a towpreg; measuring a basis weight for each of the fiber bundles of said stock before impregnation by a resin; defining groups of fiber bundles from said stock based of the fiber basis weight, thereby providing determined fiber bundles; predicting a fiber basis weight of a towpreg when the plurality of fiber bundles is combined to form the towpreg, thereby providing a predicted fiber basis weight of a towpreg; and producing the towpreg using a combination of fiber bundles from all groups of determined fiber bundles in which the predicted fiber basis weight of the towpreg is in a range determined from a target value of a basis weight of a towpreg.

9 Claims, 2 Drawing Sheets

(51) Int. Cl.
*D04H 1/58* (2012.01)
*D04H 3/04* (2012.01)
*D04H 3/12* (2006.01)

(56) References Cited

FOREIGN PATENT DOCUMENTS

| | | | |
|---|---|---|---|
| JP | 2012184279 | * | 9/2012 |
| JP | 2018171772 | * | 11/2018 |

OTHER PUBLICATIONS

Machine Translation of JP2018171772 (Year: 2018).*
International Search Report and Written Opinion for International Application No. PCT/IB2019/001363, dated Apr. 23, 2020, 7 pages.

* cited by examiner

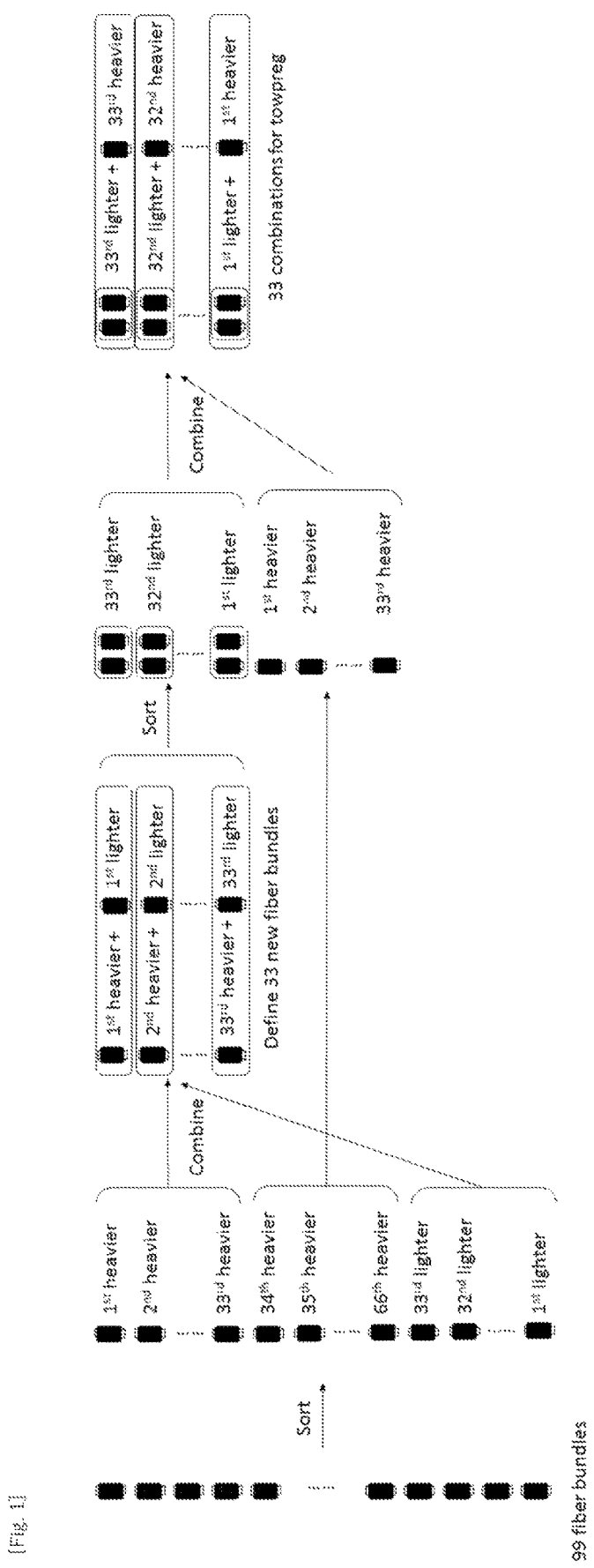
[Fig. 1]

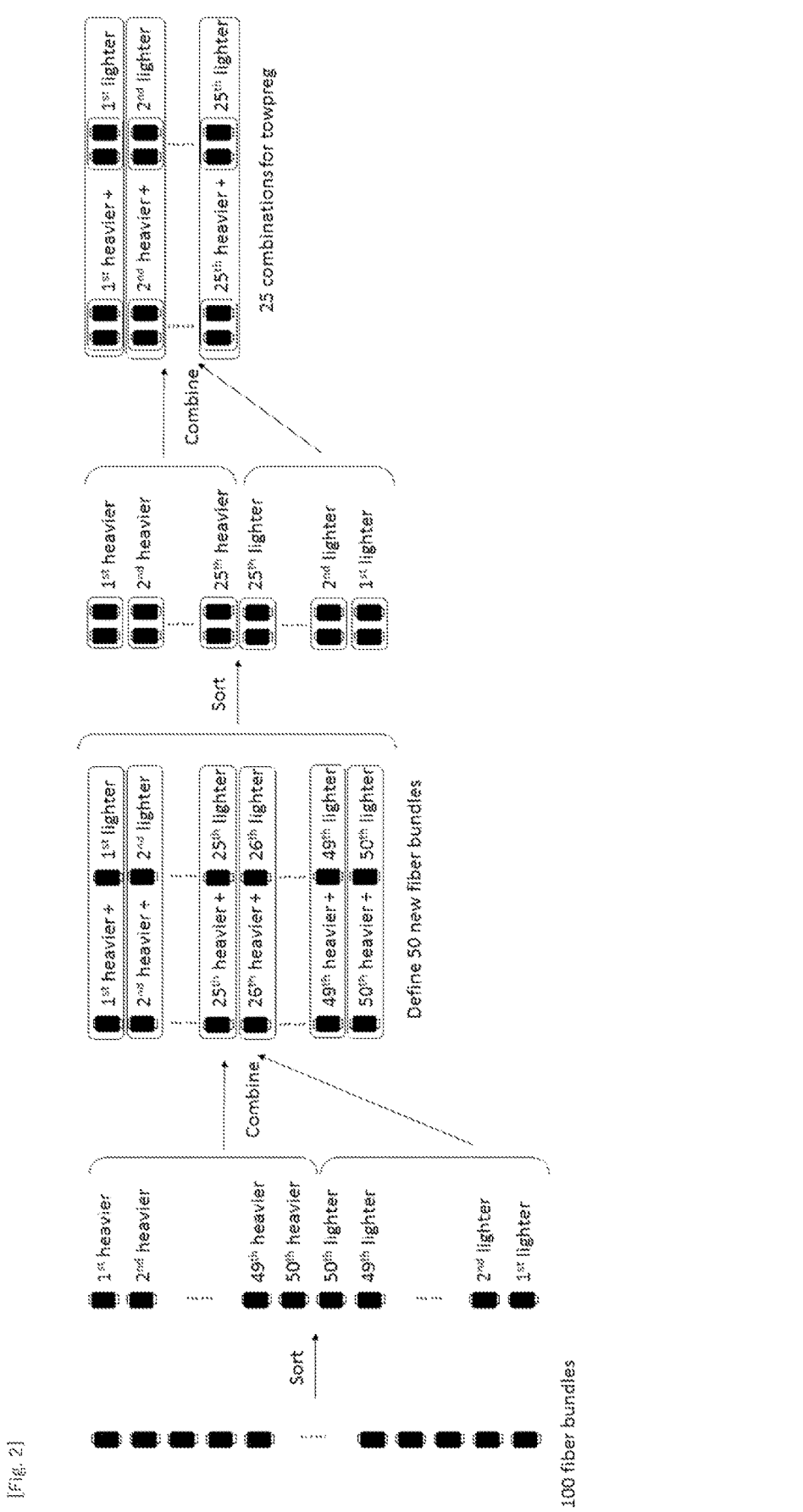
[FIG. 2]

METHOD FOR PRODUCING TOWPREG

CROSS REFERENCE TO RELATED APPLICATIONS

This is the U.S. National Phase application of PCT/IB2019/001383, filed Dec. 19, 2019 which claims priority to European Patent Application No. 19305158.8, filed Feb. 8, 2019, the disclosures of each of these applications being incorporated herein by reference in their entireties for all purposes.

FIELD OF THE INVENTION

The present invention relates to a production method capable of homogeneously producing a tape-shaped unidirectional prepreg in which fibers are impregnated with a resin in advance with good reproducibility.

BACKGROUND OF THE INVENTION

Fiber reinforced plastic (FRP) consists of reinforcing fibers and a matrix resin. FRP is excellent in mechanical properties, especially specific elastic modulus and specific strength, and is widely used for structural materials such as aviation and automobiles, sporting goods, electric appliance housings, and the like. Although there are various molding methods of FRP, in the molding methods, a prepreg in which reinforcing fibers are partially or fully impregnated with a matrix resin in advance is often used. A basis weight of the matrix resin can be controlled when aligned reinforcing fibers are impregnated with the resin to produce a prepreg, and there is an advantage that variations in the amount of the matrix resin contained in the FRP can be reduced during FRP molding.

In general, prepregs are wide, such as 1 m, hard to follow a mold having a curved surface in two or more directions, and are difficult to mold FRP with a complicated shape. Therefore, as disclosed in Patent Literature EP3162842A1, a technique of molding FRP with a complicated shape such as a tank by winding a tape-shaped unidirectional prepreg obtained by impregnating a single fiber bundle with a resin around a mold, a filament winding method, has been conventionally known. Further, as disclosed in Patent Literature EP2841369A1, a technique of molding FRP with a complicated shape by once producing a wide prepreg, then slitting the prepreg in a fiber direction to be processed into a tape-shaped unidirectional prepreg, and making the tape-shaped unidirectional prepreg follow a mold one by one using a robot, an automatic lamination method, has been expanding.

Meanwhile, in the filament winding method and the automatic lamination method, FRP is produced using one or a limited number of tape-shaped unidirectional prepreg, so that when variations in basis weight among the tape-shaped unidirectional prepregs are large, there are problems that a total weight is varied when the tape-shaped unidirectional prepreg is made into FRP, and a thickness of each part is deviated from a designed thickness.

In order to solve the above problems, an aim of the present invention is to provide a method for producing a tape-shaped unidirectional prepreg, which can reduce variations in basis weight of the tape-shaped unidirectional prepreg with good reproducibility. Among others, in order to produce a tape-shaped unidirectional prepreg that can be used for the filament winding method and the automatic lamination method at low cost, an aim of the present invention is to provide a method for producing a towpreg in which a fiber bundle is directly impregnated with a resin to process the resulting material into a tape shaped unidirectional prepreg in less number of steps.

SUMMARY OF THE INVENTION

The present invention according to exemplary embodiments relates to a method for producing a towpreg by impregnating a plurality of fiber bundles with a resin to form a single towpreg, the method including measuring a basis weight for each of the fiber bundles before impregnation, predicting a fiber basis weight of a towpreg when the plurality of fiber bundles is combined to be formed into the towpreg, and producing the towpreg using a combination of fiber bundles in which the fiber basis weight of the towpreg to be predicted is in a range determined from a target value.

Typically a towpreg comprises a reinforcing fiber bundle, which is impregnated with a thermosetting resin, including thousands to tens of thousands of filaments arranged in one direction is impregnated with a thermosetting resin.

BRIEF DESCRIPTION OF DRAWINGS

FIG. 1 schematically illustrates when three fiber bundles are combined to form a single towpreg according to an embodiment of the present invention, where 99 different fiber bundles are sorted in order of basis weight to provide 3 groups of 33 fiber bundles.

FIG. 2 schematically illustrates when four fiber bundles are combined to form a single towpreg according to an embodiment of the present invention, where a new group of 50 fiber bundles is defined by sorting 100 fiber bundles in order of basis weight and combining an Nth lighter fiber bundle and an Nth heavier fiber bundle, and preferably combining an Nth lightest fiber bundle and an Nth heaviest fiber bundle.

DETAILED DESCRIPTION OF EMBODIMENTS OF THE INVENTION

Hereinafter, the details of the present invention will be described.

A fiber bundle can be impregnated with a resin while controlling an amount of the resin during production of a towpreg, so that it is possible to produce a towpreg by reproducibly controlling the amount of the resin in the towpreg. Meanwhile, when a basis weight of a fiber bundle itself varies, a basis weight of the towpreg will not be stabilized. Generally, a single towpreg is produced by impregnating a single fiber bundle with a resin, so that variations in basis weight of the fiber bundle itself are directly reflected in variations in basis weight of fibers contained in the towpreg. The basis weight of the fiber bundle is generally bundled with a measured value of a cut-out sample from a fiber bundle production batch, and thus there is no information of variations in basis weight of individual fiber bundles.

Therefore, in embodiments of the present invention, a plurality of fiber bundles is impregnated with a resin to form a single towpreg, and a basis weight of each fiber bundle is measured before impregnation, and a fiber basis weight of a towpreg when the plurality of fiber bundles is combined to form the towpreg is predicted. When the basis weight of each fiber bundle is measured in advance, a sum of the basis weight of fiber bundles to be combined can be predicted as a fiber basis weight when the plurality of fiber bundles is combined to form the towpreg. Here, as a method for measuring the basis weight of the fiber bundle, any method may be used as long as a basis weight representing each fiber bundle can be logically estimated, and for example, a weight of a fiber bundle unwound by a constant length such as 1 m may be measured a plurality of times such as three or five times and an average value thereof may be used, or, for example, when a length wound around a bobbin during producing a fiber bundle is known, a whole weight may be measured for each bobbin and divided by the length.

In the present invention, used is a combination of fiber bundles in which the fiber basis weight of the towpreg to be predicted is in a range determined from a target value. Accordingly, in one embodiment, the method of the invention comprises determining a target value for the fiber basis weight of the towpreg. The range determined as the target value is typically specified by product specification. The target value may be average, median, mode of a basis weight of a group of fiber bundles to be used. By only adopting a combination of fiber bundles in which a basis weight falls within the determined range, it is possible to control the fiber basis weight of the towpreg within a desired range.

In one embodiment, the groups are defined by sorting the fiber bundles in order of the fiber basis weight, thereby providing determined fiber bundles.

In one embodiment, N fiber bundles are in the original stock; the fiber bundles are sorted in order of basis weight into two or more groups, then fiber bundles from different groups are combined to from a 1st combination of fiber bundles, then the 1st combination of fiber bundles is sorted in order of basis weight into one or more groups of $1^{st}$ combinations of fiber bundles, then fiber bundles of the $1^{st}$ combination are combined either with fiber bundles of another $1^{st}$ combination or with fiber bundles of an original group to form a $2^{nd}$ combination of fiber bundles; then repeating the sequence of sorting and combining fiber bundles to provide a towpreg having the required number of fiber bundles.

In a preferred aspect 1 of the present invention, when a towpreg is produced using all groups of determined fiber bundles, a combination of fiber bundles is preferably used in which an integration of squares of a difference between the fiber basis weight of the towpreg to be predicted and the target value is minimized. This can greatly reduce a possibility of producing a towpreg with large deviation from the target value. A group of fiber bundles is divided into the number of fiber bundles constituting the towpreg to predict the fiber basis weight of the towpreg that can be produced. A division method is derived by simulation, in which the integration of the squares of the difference between the fiber basis weight of the towpreg and the target value for all towpreg that can be produced is minimized. Combinations of all fiber bundles may be calculated, or a division method may be selected in which the group of fiber bundles is randomly divided in a predetermined number of times, and among them, the integration of the squares of the difference between the fiber basis weight of the towpreg that can be produced and the target value is minimized.

In a preferred aspect 2 of the present invention, when the towpreg is produced using all groups of determined fiber bundles, it is preferable to repeat the following procedure to combine a plurality of fiber bundles.

[A] The groups of fiber bundles are sorted in order of basis weight of the fiber bundles,

[B] one selected in descending order of basis weight and one selected in ascending order of basis weight are sequentially combined, and

[C] a sum of the basis weight of the combined fiber bundles is newly defined as a basis weight of the fiber bundles, and new groups of fiber bundles are defined.

This makes it possible to average fiber basis weights in a group of towpreg to be efficiently produced, and even when there is a variation in basis weight among the fiber bundles in the fiber bundle group to be used for producing a towpreg, at least a towpreg produced using the same fiber bundle group can realize almost the same fiber basis weight.

An effect of the preferred aspect 2 is shown quantitatively with reference to specific examples. Using 100 fiber bundle groups for producing a towpreg, two fiber bundles are each combined to form a single towpreg after resin impregnation. In one embodiment, the average basis weight of the fiber bundle group is normalized to 100, and the variation is expressed as standard deviation (hereinafter SD.). In one embodiment, a basis weight of 100 fiber bundles is artificially calculated by using random numbers so that SD. is 5, assuming that the variations in basis weight among 100 fiber bundles follow a normal distribution. For example, the average value of five calculation results is summarized in Table 1 as Condition 1. The average value of maximum values of fiber bundles in the five calculations was 111.8, and the average value of minimum values was 87.2. That is, in a case where a single towpreg is produced from a single fiber bundle, when 100 towpreg are produced, it will include a fiber basis weight variation of about ±12% between the towpregs. In addition, when a variation in the amount of resin is added, the basis weight variation as the towpreg may exceed ±15%. When FRP is molded using a single or a limited number of towpreg, it means that the total weight of FRP greatly fluctuates depending on the towpreg to be used even when the same length of towpreg is put.

Next, in one embodiment, calculations are performed when two fiber bundles are combined to form a single towpreg. In the case of Condition 1, the fiber basis weight of a towpreg when the towpreg was produced by randomly combining two fiber bundles from 100 fiber bundles was normalized with an expectation value as 100 when the two fiber bundles were combined. The result of calculating variations by SD. was summarized in Table 2. Although the variation is somewhat reduced by combining two fiber bundles, the average value of maximum values of the fiber basis weight of the towpreg in five calculations is 106.7 and the average value of minimum values is 92.0, and when 50 towpregs are produced, the fiber basis weight variation of about ±8% remains between the towpregs. In this case, it is difficult to reduce a weight variation during FRP molding (Comparative Example 1).

Here, when the two fiber bundles were combined to form a single towpreg based on the preferred aspect 2, in the case of Condition 1, a fiber basis weight when 50 towpregs were produced by sorting 100 fiber bundles in order of basis weight and combining an Nth lighter fiber bundle and an Nth heavier fiber bundle was normalized with an expectation value as 100 when the two fiber bundles were combined. The result of calculating variations by SD. was summarized in Table 3. It was drastically reduced to ⅒ or less, from variations in the basis weight of the fiber bundles of SD. 4.9 to variations in the fiber basis weight when formed into the towpreg of SD. 0.29. In this example, the average value of maximum values of the fiber basis weight of the towpreg in five calculations is 100.5 and the average value of minimum values is 99.0, and when 50 towpregs is produced, the fiber basis weight variation could be controlled to ±1% or less between the towpregs (Example 1). By using the towpreg produced by the production method of the present invention, it can be expected that the weight variation during FRP molding is greatly reduced.

The term "lighter" among N groups refers to a group N−1 having a lighter basis weight than group N. The term "heavier" among N groups refers to a group N having a heavier basis weight than group N−1. In one preferred embodiment, "lighter" refers to "the lightest" and "heavier" refers to "the heaviest". In such an embodiment, the term "lighter" in the invention means (or could be replaced by) "lightest" and the term "heavier" by "heaviest".

Subsequently, another example is a case where, using 99 fiber bundle groups for producing a towpreg, three fiber bundles are each combined to form a single towpreg after resin impregnation. Likewise, a basis weight of 99 fiber bundles is artificially calculated by using random numbers so that SD. is 5, assuming that the variations in basis weight among 99 fiber bundles follow a normal distribution. The average value of five calculation results is summarized in Table 1 as Condition 2. Next, the fiber basis weight average of a towpreg, when the towpreg was produced by randomly combining three fiber bundles from 99 fiber bundles, was normalized to 100, and the result of calculating variations by SD. was summarized in Table 2 (Comparative Example 2). Here, by reference to FIG. 1 as an illustrative purpose, when the three fiber bundles are combined to form a single towpreg based on the present invention, 99 different fiber bundles are provided and sorted in order of basis weight to provide 3 groups of 33 fiber bundles. Then fiber bundles are combined so that a fiber bundle from a lighter group, preferably the lightest fiber bundle of this lighter group, is combined with a fiber bundle from a heavier group, preferably the heaviest fiber bundle of this heavier group. Preferably, the combination is made between the lightest and the heaviest groups. The combination of two fiber bundles forms a new group of fiber bundles. After combining the groups formed by combination of two fiber bundles are then sorted again in order of basis weight. In this example, two groups of fiber bundles are provided, one with several combinations of two fiber bundles, the other, corresponding to the original group of fiber bundles of the $33^{rd}$ to the $66^{th}$ heavier (or heaviest) fiber bundles. Then fiber bundles are combined again so that a fiber bundle from a lighter group, preferably the lightest fiber bundle of this lighter group, is combined with a fiber bundle from a heavier group, preferably the heaviest fiber bundle of this heavier group. This provide a combination of three fiber bundles. Typically in this example, an Nth fiber bundle, as to 1st to 33rd lighter fiber bundles and 1st to 33rd heavier fiber bundles are first combined thereby providing a new group. This new group comprises 33 combinations of fiber bundles. Then, 33 towpregs were produced by sorting in order of basis weight in the new group of 33 combinations of fiber bundles and combining an Nth lighter fiber bundle in the new group of fiber bundles and an Nth heavier fiber bundle in the original group of fiber bundles, wherein the bass weight was normalized with an expectation value as 100 (when the three fiber bundles were combined), and the result of calculating variations by SD. was summarized in Table 3 (Example 2).

Subsequently, another example is a case where, using 100 fiber bundle groups for producing a towpreg, four fiber bundles are each combined to form a single towpreg after resin impregnation. Likewise, a basis weight of 100 fiber bundles is artificially calculated by using random numbers so that SD. is 5, assuming that the variations in basis weight among 100 fiber bundles follow a normal distribution. The average value of five calculation results is summarized in Table 1 as Condition 3. Next, the fiber basis weight of a towpreg when the towpreg was produced by randomly combining four fiber bundles from 100 fiber bundles was normalized with an expectation value as 100 when the four fiber bundles were combined, and the result of calculating variations by SD. was summarized in Table 2 (Comparative Example 3). Here, by reference to FIG. 2 as an illustrative purpose, when the four fiber bundles are combined to form a single towpreg based on the preferred aspect 2, a new group of 50 fiber bundles is defined by sorting 100 fiber bundles in order of basis weight and combining an Nth lighter fiber bundle and an Nth heavier fiber bundle, and preferably combining an Nth lightest fiber bundle and an Nth heaviest fiber bundle. 25 towpregs were produced by sorting in order of basis weight in this new group of 50 fiber bundles and combining an Nth heavier fiber bundle and an Nth lighter fiber bundle in the new group of fiber bundles, so that the fiber basis weight was normalized with an expectation value as 100 when four fiber bundles were combined. The result of calculating variations by SD. was summarized in Table 3 (Example 4).

Subsequently, other examples are a case where, using 100 fiber bundle groups for producing a towpreg, five fiber bundles are each combined to form a single towpreg after resin impregnation (Condition 4), a case where, using 120 fiber bundle groups for producing a towpreg, six fiber bundles are each combined to form a single towpreg after resin impregnation (Condition 5), and a case where, using 140 fiber bundle groups for producing a towpreg, seven fiber bundles are each combined to form a single towpreg after resin impregnation (Condition 6), calculation was performed in the same procedure, and the calculation results were summarized in Tables 1, 2 and 3. In any cases of Examples 1 to 6 calculated by using the technique of the preferred aspect 2, as compared to Comparative Examples 1 to 6 in which necessary number of fiber bundles are randomly combined, it is understood that both of the fiber basis weight variations of the towpreg, and the variation ranges from the target value are greatly reduced.

In a preferred aspect 3 of the present invention, when a towpreg is produced using all groups of predetermined fiber bundles, after the groups of fiber bundles are sorted in order of basis weight of the fiber bundles, the groups of fiber bundles are equally divided into units of the number of fiber bundles required for the towpreg in order of basis weight, and fiber bundles are combined by selecting one from each of the units. The selection from the fiber bundle units may be performed randomly, and further preferably, the next procedure of combining two fiber bundles is repeated to select one from all units.

[a] One selected from a unit in descending order of basis weight of fiber bundles and one selected in ascending order of basis weight of fiber bundles in other unit are sequentially combined, and

[b] a sum of the basis weight of the combined fiber bundles is newly defined as a basis weight of the fiber bundles, and new units of fiber bundles are defined.

An effect of the preferred aspect 3 is shown quantitatively with reference to specific examples. In a case where two or three fiber bundles are combined to form a towpreg, the same procedure as in the preferred aspect 2 is performed. Here, an example is a case of Condition 3 where, using 100 fiber bundle groups for producing a towpreg, four fiber bundles are each combined to form a single towpreg after resin impregnation. First, 100 fiber bundles are sorted in order of basis weight and divided into 4 units (1st to 25th, 26th to 50th, 51st to 75th, and 76th to 100th, in descending order of basis weight) in order of basis weight. One selected from the 1st to 25th units in descending order of basis weight and one selected from the 76th to 100th units in ascending order of basis weight are combined, and a sum of the basis weight of the combined fiber bundles is newly defined as a basis weight of the fiber bundles, and a new group of 25 fiber bundles (new unit 1) is defined. One selected from the new unit 1 in descending order of basis weight and one selected from the 51st to 75th units in ascending order of basis weight are combined, and a sum of the basis weight of the combined fiber bundles is newly defined as the basis weight of the fiber bundles, and a new group of 25 fiber bundles (new unit 2) is defined. One selected from the new unit 2 in descending order of basis weight and one selected from the 26th to 50th units in ascending order of basis weight are combined, and a sum of the basis weight of the combined fiber bundles becomes a fiber basis weight of a towpreg in which four fiber bundles are combined. The fiber basis weight of this towpreg was normalized with an expectation value of basis weight as 100 when the four fiber bundles were combined, and the result of calculating variations by SD. was summarized in Table 3 (Example 7). In a case where the four fiber bundles were randomly selected from 100 fiber bundles (Comparative Example 3), the variation in the basis weight of the fiber bundles when formed into the towpreg was SD. 2.4, whereas the variation was drastically reduced to ⅒ or less to SD. 0.13 in the case of the preferred aspect 3. The average value of maximum values of the fiber basis weight of the towpreg in five calculations is 100.2 and the average value of minimum values is 99.8, and when 25 towpregs is produced, the fiber basis weight variation could be controlled to only ±0.2% between the towpregs.

Subsequently, other examples are a case where, using 100 fiber bundle groups for producing a towpreg, five fiber bundles are each combined to form a single towpreg after resin impregnation (Condition 4), a case where, using 120 fiber bundle groups for producing a towpreg, six fiber bundles are each combined to form a single towpreg after resin impregnation (Condition 5), and a case where, using 140 fiber bundle groups for producing a towpreg, seven fiber bundles are each combined to form a single towpreg after resin impregnation (Condition 6), calculation was performed in the same procedure, and the calculation results were summarized in Tables 1, 2 and 3. In any cases of Examples 7 to 10 calculated by using the technique of the preferred aspect 3, as compared to Comparative Examples 3 to 6 in which necessary number of fiber bundles are randomly combined, it is understood that both of the fiber basis weight variations of the towpreg, and the variation ranges from the target value are greatly reduced.

While the preferred aspects from 1 to 3 of the present invention provide production methods of a towpreg when the towpreg is produced using all groups of determined fiber bundles, the groups of determined fiber bundles can be selected from a stock of fiber bundles.

Accordingly, the invention comprises a step of defining groups of fiber bundles from a stock of fiber bundles, thereby providing determined fiber bundles.

More preferably, two fiber bundles are stacked in a thickness direction to form a single towpreg. In combining two fiber bundles, a contact surface between the fiber bundles is large when the fiber bundles are stacked in the thickness direction rather than being adjacent to each other in a width direction, and it is hard to separate the fiber bundles after being integrated into a single towpreg. In some cases, twisting is applied depending on the fiber bundle, and when a single towpreg is produced from a single fiber bundle, a width narrows greatly at a portion where twisting is applied. Meanwhile, even when a single fiber bundle is twisted by stacking two fiber bundles in the thickness direction, there is little possibility that the other fiber bundle is also twisted in the same position, and thus a uniform towpreg width can be realized. Therefore, it contributes to homogeneous production of a towpreg with good reproducibility. Especially in the case of producing FRP by an automatic lamination method, a towpreg with high width accuracy is required, so that the towpreg produced by the production method of the present invention is suitable.

The resin impregnated into the fiber bundle may be a thermoplastic resin, but is preferably a thermosetting resin. When the towpreg is made into FRP, high chemical resistance and heat resistance can be easily obtained. In addition, even when there is no special heating source, the towpreg can be laminated and integrated by tackiness and it is easy to handle. More preferably, an epoxy resin has excellent balance between dynamic characteristics and heat resistance. The lower the viscosity of the resin to be impregnated into the towpreg is, for example, 1 Pa·s or less at 40° C., the more easily the resin is impregnated, and production efficiency of the towpreg increases. On the other hand, in order to realize a towpreg with high quality, in particular, high width accuracy as used in the automatic lamination method, it is preferable that the viscosity of the resin is 100 Pa·s or more at 40° C. Since the viscosity is high at room temperature, the towpreg is difficult to deform during storage and the towpreg is easy to maintain width accuracy during production. Not only the basis weight but also the geometry of the towpreg can be made homogeneous, contributing to a production method with good reproducibility. More preferably, the viscosity of the resin is 1000 Pa·s or more at 40° C. In the present invention, the viscosity of the resin is determined by setting a resin so that the vertical distance of a parallel plate with a diameter of 25 mm is 1 mm, and measuring at a frequency of 1 Hz in a torsion mode.

A fiber type used for the fiber bundle may be a polymer fiber, a ceramic fiber or a metal fiber, but a fiber having excellent specific strength and specific elastic modulus such as an aramid fiber, a basalt fiber, a glass fiber or a carbon fiber is preferable. Among them, use of carbon fibers having excellent characteristics such as lighter weight, high mechanical properties and chemical resistance can contribute to enhancement of the performance of FRP. As compared to fibers produced by melt spinning, carbon fibers produced through complicated processes such as carbonization are likely to have large basis weight variations. Even with fibers having a large basis weight variation, the fiber basis weight when formed into a towpreg can be stabilized by using the production method of the present invention, so that the effect of the present invention is strongly exerted particularly when carbon fibers are used. For example, carbon fiber are selected from the group consisting of TORAYCA carbon fiber T300-3K-50A, T700S-12K-31E, T700S-24K-60E, T800S-24K-10E, T1100G-12K-71E, M46J-12K-50A, M55J-6K-50B (Toray Industries), PANEX 35 (Zoltek).

The method for producing a towpreg according to the present invention can be applied to a production of a tape-shaped unidirectional prepreg in which fibers are impregnated with a resin in advance, which is used as a molding material for fiber reinforced plastic.

Typically, dimensions (width) of the tape-shaped unidirectional prepreg are ranging from 1 mm to 100 mm, preferably from 3 mm to 50 mm.

Typically, the method known by a skilled person for producing the tape-shaped unidirectional prepreg has no limit according to the invention unless the plurality of fiber bundles can be wet by a resin to impregnated the fiber bundles. Preferably, the amount of resin is directly dosed onto the fiber bundle or dosed once to roller then the resin is transferred from the roller to the fiber bundle. The resin can be applied from one side of the fiber bundle, or from the both sides. Typically, after resin is applied to the fiber bundles, they can be passed through rollers or calendared to enhance impregnation. The fiber bundles can be combined before impregnation or impregnated at first, then impregnated fiber bundles are combined. Preferably, after applying resin to fiber bundles, the fiber bundles are combined and passed through rollers to be impregnated and integrated into one towpreg.

TABLE 1

| Parameter study for examples | | | | | | |
|---|---|---|---|---|---|---|
| Condition N° | 1 | 2 | 3 | 4 | 5 | 6 |
| Sample Number | 100 | 99 | 100 | 100 | 120 | 140 |
| Number of bundle combined | 2 | 3 | 4 | 5 | 6 | 7 |
| Number of towpreg made | 50 | 33 | 25 | 20 | 20 | 20 |
| Simulation frequency | 5 | 5 | 5 | 5 | 5 | 5 |
| Average bundle weight | 99.9 | 99.9 | 100.0 | 100.0 | 100.2 | 99.9 |
| SD. of bundle weight | 4.9 | 4.9 | 4.9 | 5.1 | 4.92 | 5.2 |
| Max. bundle weight | 111.8 | 112.4 | 11.8 | 113.1 | 112.2 | 114.1 |
| Min. bundle weight | 87.2 | 87.4 | 87.0 | 86.9 | 88.0 | 86.4 |

TABLE 2

Parameter study for comparative examples

| Comparative Example n° | 1 | 2 | 3 | 4 | 5 | 6 |
|---|---|---|---|---|---|---|
| Condition | 1 | 2 | 3 | 4 | 5 | 6 |
| Average bundle weight | 99.9 | 99.9 | 100.0 | 100.0 | 100.2 | 99.9 |
| SD. of bundle weight | 3.6 | 3.0 | 2.4 | 2.0 | 2.1 | 1.9 |
| Max. bundle weight | 106.7 | 106.6 | 104.9 | 104.1 | 104.5 | 103.6 |
| Min. bundle weight | 92.0 | 94.4 | 95.1 | 96.2 | 96.6 | 96.4 |

TABLE 3

Parameter study for examples

| Example n° | 1 | 2 | 3 | 4 | 5 | 6 | 7 | 8 | 9 | 10 |
|---|---|---|---|---|---|---|---|---|---|---|
| Condition | 1 | 2 | 3 | 4 | 5 | 6 | 3 | 4 | 5 | 6 |
| Average bundle weight | 99.9 | 99.9 | 100.0 | 100.0 | 100.2 | 99.9 | 100.0 | 100.0 | 100.2 | 99.9 |
| SD. of bundle weight | 0.29 | 0.25 | 0.13 | 0.09 | 0.10 | 0.08 | 0.13 | 0.13 | 0.07 | 0.07 |
| Max. bundle weight | 100.5 | 100.3 | 100.2 | 100.2 | 100.4 | 99.9 | 100.2 | 100.2 | 100.3 | 99.9 |
| Min. bundle weight | 99.0 | 99.4 | 99.6 | 99.9 | 100.1 | 99.7 | 99.8 | 99.8 | 100.1 | 99.7 |

The invention claimed is:

1. A method for producing a towpreg by impregnating a plurality of fiber bundles with a resin to form a single towpreg, characterized in that the method comprises:
   providing a stock of fiber bundles for preparing the towpreg;
   measuring a basis weight for each of the fiber bundles of said stock before impregnation by a resin;
   defining groups of fiber bundles from said stock based of the fiber basis weight, thereby providing determined fiber bundles;
   predicting a fiber basis weight of the towpreg when the plurality of fiber bundles is combined to form the towpreg, thereby providing a predicted fiber basis weight of a towpreg; and
   producing the towpreg using a combination of fiber bundles from all groups of determined fiber bundles in which the predicted fiber basis weight of the towpreg is in a range determined from a target value of a basis weight of a towpreg,
   further characterized in that, when the towpreg is produced using all groups of the determined fiber bundles, a procedure below is repeated to combine the plurality of fiber bundles:
   [A]: the groups of fiber bundles are sorted in order of basis weight of the fiber bundles,
   [B]: one fiber bundle selected in descending order of basis weight and another fiber bundle selected in ascending order of basis weight are sequentially combined, and
   [C]: a sum of the basis weight of the combined fiber bundles is newly defined as a basis weight of the fiber bundles, and new groups of fiber bundles are formed from the combined fiber bundles.

2. The method for producing the towpreg according to claim 1, characterized in that, when the towpreg is produced using all groups of determined fiber bundles, a combination of fiber bundles is used in which an integration of squares of a difference between the fiber basis weight of the towpreg to be predicted and the target value is minimized.

3. The method for producing the towpreg according to claim 1, characterized in that, when the towpreg is produced using all groups of determined fiber bundles, after the groups of fiber bundles are sorted in order of basis weight of the fiber bundles, the groups of fiber bundles are equally divided into units of a number of fiber bundles required for the towpreg in order of basis weight, and fiber bundles are combined by selecting one fiber bundle from each of the units.

4. The method for producing a-the towpreg according to claim 1, characterized in that two fiber bundles are stacked in a thickness direction to form a single towpreg.

5. The method for producing the towpreg according to claim 1, characterized in that the resin to be impregnated into the towpreg has a viscosity at 40° C. of 100 Pa·s or more.

6. The method for producing the towpreg according to claim 1, characterized in that each of the fiber bundles comprises carbon fibers.

7. A towpreg obtainable by the method according to claim 1.

8. A fiber reinforced plastic comprising or consisting of a plurality of towpregs according to claim 7.

9. A manufactured article comprising or made of one or more fiber reinforced plastic of claim 8.

* * * * *

UNITED STATES PATENT AND TRADEMARK OFFICE
CERTIFICATE OF CORRECTION

PATENT NO. : 12,011,853 B2
APPLICATION NO. : 17/425083
DATED : June 18, 2024
INVENTOR(S) : Ichiro Taketa and Reo Takaiwa It is certified that error appears in the above-identified patent and that said Letters Patent is hereby corrected as shown below:

On the Title Page

Under OTHER PUBLICATIONS: "Translationo F" should be -- Translation of --.

In the Claims

Column 10, Line 39, Claim 4: "a-the" should be -- the --.

Signed and Sealed this
Seventeenth Day of September, 2024

*Katherine Kelly Vidal*
Katherine Kelly Vidal
*Director of the United States Patent and Trademark Office*